United States Patent [19]
Walker

[11] 3,841,671
[45] Oct. 15, 1974

[54] COAXIAL FLUID LINES WITH PLUG-IN CONNECTOR ASSEMBLIES

[75] Inventor: Frank H. Walker, Grand Blanc, Mich.

[73] Assignee: General Motors Corporation, Detroit, Mich.

[22] Filed: Oct. 30, 1973

[21] Appl. No.: 410,982

[52] U.S. Cl............. 285/133 R, 285/174, 285/321
[51] Int. Cl............................................ F16l 39/00
[58] Field of Search.... 285/133 R, 138, 233, 321 F, 285/174

[56] References Cited
UNITED STATES PATENTS

| | | | |
|---|---|---|---|
| 2,492,006 | 12/1949 | Roybould | 285/321 X |
| 2,521,127 | 9/1950 | Price | 285/321 X |
| 2,781,207 | 2/1957 | Detweiler et al. | 285/233 |
| 2,956,586 | 10/1960 | Zeigler et al. | 285/133 R X |

FOREIGN PATENTS OR APPLICATIONS

| | | | |
|---|---|---|---|
| 1,059,847 | 11/1953 | France | 285/133 R |
| 1,255,417 | 11/1967 | Germany | 285/137 R |

Primary Examiner—Dave W. Arola
Attorney, Agent, or Firm—Charles R. White

[57] ABSTRACT

Coaxial elastomer hoses are hydraulically coupled to fluid units by male plug-in connector assemblies, each incorporating concentric pipes which are pre-assembled on the hoses. Each pipe extends axially from the associated hose and carries a sleeve-like fitting and a fluid sealing O-ring disposed adjacent to the ends thereof. A single snap ring retains the plug-in connector assembly in installed position in the fluid unit and securely anchors each of the concentric pipes to the fluid unit housing.

3 Claims, 2 Drawing Figures

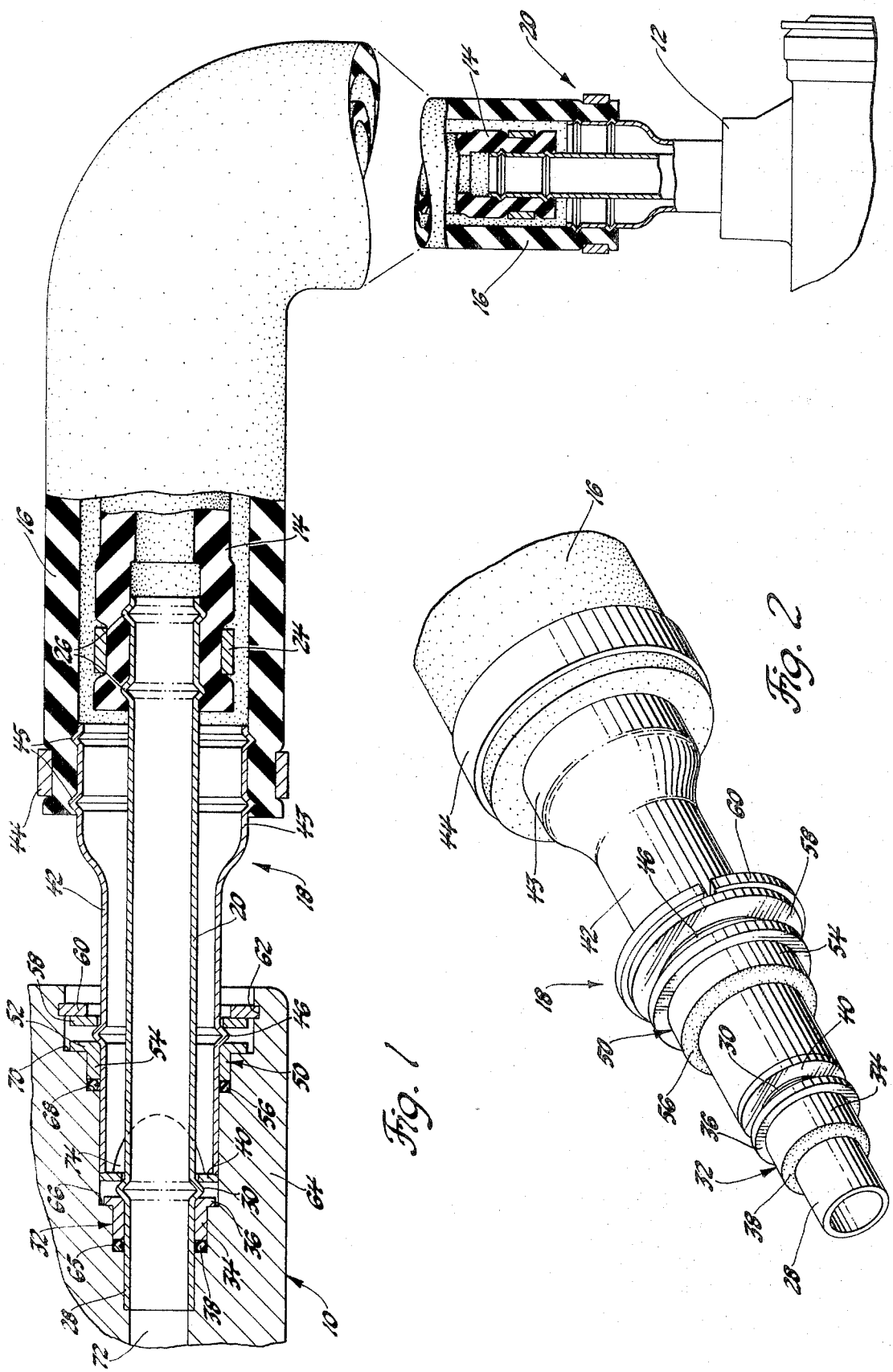

COAXIAL FLUID LINES WITH PLUG-IN CONNECTOR ASSEMBLIES

This invention relates to coaxial fluid flow lines providing separate passages for the transfer of fluid between fluid units and more particularly to new and improved connector assemblies for hydraulically coupling concentric hoses into fluid unit housings.

Prior coaxial fluid lines utilizing concentric hoses for transferring fluid between hydraulic units have generally required complex connector means for coupling the hoses with the fluid units. Many of these prior connectors require special outwardly-projecting fittings threaded and welded to the fluid unit housings. In some prior art devices the inner hose is connected with the projecting fitting by pipe means slip fitted therein without substantial retention provision. After installation of the inner pipe means, outer hose means is installed over an outer fitting and is secured thereto by threaded hose clamp means.

In this invention two or more coaxial hoses can be employed for the transfer of fluid in the same or opposite directions at common or variable pressure levels. With this invention there is reduced exposure to external leaks with the location of the highest fluid pressure line at the center and the lowest fluid pressure line outside of the internal line. Furthermore, there is reduced space requirements, reduced cost and improved appearance by eliminating the projecting fluid fittings for prior coaxial fluid lines. There is reduced handling and assembly costs by incorporating a male plug-in assembly at each end of coaxial hoses to replace the male threaded and welded fittings of fluid unit housings.

In the preferred embodiment of this invention, coaxial hoses, providing separate fluid transfer passages, are coupled to fluid units by new and improved male connector assmblies which can be easily plugged into the fluid unit. The connector assemblies of this invention are readily made from conventional components and are pre-assembled on the hoses. The connections comprise inner and outer pipes, respectively coupled to inner and outer elastomeric hoses which project outwardly from the ends of the hoses. Each of the pipes has an annular rib to locate a shouldered sleeve or fitting trapped between the rib and a fluid sealing O-ring. Washer means trapped between the rib of the inner pipe and the end of the outer pipe hold the inner pipe securely in the fluid unit once the connector assembly is plugged into the fluid unit housing. The connector assembly is anchored to the fluid unit housing by a single snap ring which traps a retaining washer between the rib of the outer pipe and the snap ring.

These and other objects, advantages and features of this invention will become more apparent from the following detailed description and drawing in which:

FIG. 1 is a side elevational view, partly in section, of coaxial fluid flow lines and plug-in connector assemblies.

FIG. 2 is a perspective view of the plug-in connector assembly of FIG. 1.

Turning now in detail to the drawing, there is illustrated a hydraulic pump 10 operatively connected to a valve body 12 by inner and outer hydraulic lines comprising hoses 14 and 16 and plug-in assemblies 18 and 20. The hoses are preferably oil resistant flexible hoses of oil-resistant elastomeric material which operate through a wide range of temperature variations and which have a long service life. As best shown in FIG. 1, plug-in assembly 18 comprises an inner pipe 20 which is connected at one end to the inner hose 14 by hose clamp 24. The hose clamp 24 is constricted to compress the elastomer material between spaced annular ribs 26 formed on tube 20 to thereby provide a fluid-type seal between these elements. The inner pipe 20 projects forwardly from the inner hose 14 to a terminal end 28 formed with a radially extending annular rib 30. Disposed on the terminal end 28 of the inner pipe 20 is a fitting or sleeve 32 having a cylindrical shank 34 and a radially extending head portion 36. This fitting is held in position on the inner pipe between rib 30 and an elastomer O-ring 38. Disposed on the opposite side of rib 30 is a washer 40 which is engaged by the end of the outer pipe 42 to retain the inner pipe in installed position. The outer pipe has a large diameter portion 43 connected to the outer hose 16 by hose clamp 44 that compresses the material of the outer hose into the space between the radial extending ribs 45 on the outer pipe to form a fluid-tight connection. The projecting end portion of the outer pipe 42 is formed with an annular rib 46 and has a sleeve or fitting 50 disposed thereon. This sleeve has a radially extending head 52 disposed against the rib and a cylindical shank 54 surrounding the outer pipe. The fitting 50 is held in position against the rib 46 by elastomer O-ring 56 disposed around the outer pipe. Mounted on the outer pipe on the other side of the rib 46 is a washer 58 that cooperates with a snap ring 60 that fits in an annular groove 62 in the body 64 of the pump 10 to retain the plug-in assembly 18 in the pump 10.

As best shown in FIG. 1, the body of the pump is formed with a longitudinally extending and shouldered opening which mates with plug-in connector 18. Shoulders 65 and 66 are formed for the O-ring 38 and the head portion 36 of the inner fitting 32 and shoulders 68 and 70 for O-ring 56 and the head portion 54 of the outer fitting 50.

The plug-in connector 18 is longitudinally inserted into the opening to a position in which snap ring 60 can be installed in groove 62 to retain the connector assembly in position. The snap ring 60 anchors both pipes in installed position with washer 58 bearing against rib 46 of the outer pipe and with the end of the outer pipe bearing against washer 68 disposed against inner pipe rib 30. In the installed position the O-rings provide fluid seals to prevent external leaks and separate supply and return passages 72 and 74 of pump 10.

Passage 72 leading into the inner pipe 20 and hose 14 is a high pressure passage while passage 74 is a discharge or inlet passage for exhaust oil returning from the valve body 12 via hose 16 and outer pipe 42.

The connector assembly 20 employed to connect the hoses to the valve body is the same as the connector assembly 18 and further detailed description is therefore unnecessary.

From the above it will be understood that the plug-in connector assemblies can be pre-assembled on the hoses by hose clamps as illustrated. The plug-in connector assemblies with the hoses connected can be readily inserted into the openings provided in the valve body and the pump housing and secured therein by snap rings. Since both pipes of each connector assembly are firmly anchored to the associated housing by a snap ring, they cannot work loose and cause leakage. With this invention there is quick removal of the hoses from the hydraulic units by simply removing the snap ring from the groove so that the plug-in assembly can be axially withdrawn.

While a preferred embodiment of this invention has been shown and described in detail to illustrate the invention, various changes and modifications may be made without departing from the scope of the invention set forth in the following claims.

I claim:

1. A fluid transmitting system for a fluid unit comprising a fluid unit inner and outer flexible hose means providing separate fluid flow passages, connector assembly means coupling said hose means to said fluid unit, said connector assembly means comprising first pipe means operatively connected to said inner hose means and extending from one end thereof, said first pipe means having first outwardly extending rib means, first and second retainer means disposed on opposite sides of said first rib means, first annular fluid seal means disposed around said first pipe means disposed adjacent to one end of said first retainer means to trap said first retainer means against said first rib means, second pipe means disposed around said inner pipe means operatively connected to said outer hose means and extending from one end thereof, said second pipe means having outwardly extending second rib means, third and fourth retainer means disposed on opposite sides of said second rib means, second annular fluid seal means disposed around said second pipe means to trap said third retainer means against said second rib means, and fastener means secured to said fluid unit abutting said fourth retainer means and holding said outer pipe means in abutting relationship with said second retainer means thereby holding said connector assembly in said fluid unit.

2. In a fluid transmitting system for fluid unit means, said system having fluid unit means inner and outer flexible hose means providing separate fluid flow passages and connector assembly means for said hose means, said connector assembly means comprising first pipe means operatively connected to said inner hose means and extending from one end thereof, said first pipe means having annular rib means extending radially outwardly therefrom, first and second retainer means disposed on opposite sides of said rib means, first annular fluid seal means disposed around said first pipe means disposed adjacent to an end of said first retainer means to trap said first retainer means against said rib means, second pipe means operatively connected to said outer hose means and extending from one end thereof around said first pipe means, said second pipe means having an end terminating adjacent to said first rib means, said second pipe means having second rib means extending radially outwardly therefrom, third and fourth retainer means disposed on opposite sides of said second rib means, second annular fluid seal means disposed around said second pipe means to trap said third retainer means against said second rib means, and unitary fastener means secured to said fluid unit means abutting said fourth retainer means thereby securing said outer pipe means to said fluid unit means and holding said outer pipe means in abutting relationship with said second retainer means to thereby secure said inner pipe to said fluid unit means.

3. In a system for transmitting fluid to and from a fluid unit, inner and outer flexible hose means providing separate fluid flow passages, a fluid unit, connector assembly means for said hose means providing a plug-in connection with said fluid unit, said connector assembly means comprising first pipe means operatively connected to said inner hose means and extending from one end thereof to a first terminal point, said first pipe means having first annular rib means extending outwardly therefrom, first and second retainer means disposed on opposite sides of said first rib means, first annular fluid seal means disposed around said first pipe means disposed adjacent to an end of said first retainer means to trap said first retainer means against said first rib means, second pipe means disposed around said first pipe means operatively connected to said outer hose means and extending from one end thereof to a second terminal point short of said first terminal point, said second pipe means having second projecting rib means extending radially outwardly therefrom, third and fourth retainer means disposed on opposite sides of said second rib means, second annular fluid seal means disposed around said second pipe means to trap said third retainer means against said second rib means, and snap ring means secured to said fluid unit abutting said fourth retainer means and holding said outer pipe means in abutting relationship with said second retainer means to thereby secure said connector assembly means in said fluid unit.

* * * * *

PO-1050
(5/69)

UNITED STATES PATENT OFFICE
CERTIFICATE OF CORRECTION

Patent No. 3,841,671          Dated October 15, 1974

Inventor(s) Frank H. Walker

It is certified that error appears in the above-identified patent and that said Letters Patent are hereby corrected as shown below:

Column 2, line 20, "radial" should be -- radially --.
          line 25, "cylindical" should be -- cylindrical --.

Column 3, line 11, after "unit" insert a comma (,).
          line 37, after "means" insert a comma (,).

Signed and sealed this 18th day of February 1975

(SEAL)
Attest:

RUTH C. MASON
Attesting Officer

C. MARSHALL DANN
Commissioner of Patents
and Trademarks